(12) United States Patent
Carson et al.

(10) Patent No.: US 6,354,988 B1
(45) Date of Patent: Mar. 12, 2002

(54) CENTRIFUGE GYRO DIAPHRAGM CAPABLE OF MAINTAINING MOTOR SHAFT CONCENTRICITY

(75) Inventors: David Michael Carson, Newtown; William Andrew Romanauskas, Southbury, both of CT (US)

(73) Assignee: Kendro Laboratory Products, LLP, Newton, CT (US)

( * ) Notice: Subject to any disclaimer, the term of this patent is extended or adjusted under 35 U.S.C. 154(b) by 0 days.

(21) Appl. No.: 09/334,956

(22) Filed: Jun. 17, 1999

(51) Int. Cl.[7] .................................................. B04B 9/14
(52) U.S. Cl. .......................... 494/82; 494/84; 464/180; 74/574
(58) Field of Search .............................. 494/1, 7, 9, 10, 494/12, 16, 20, 46, 82, 84, 83; 68/23.1, 23.3; 464/180; 210/144, 363; 74/572, 574

(56) References Cited

U.S. PATENT DOCUMENTS

| | | | | |
|---|---|---|---|---|
| 392,583 A | * | 11/1888 | Braun | |
| 847,009 A | * | 3/1907 | Knudsen | |
| 1,649,346 A | * | 11/1927 | Grimble et al. | |
| 1,783,546 A | * | 12/1930 | Petsche et al. | |
| 1,824,722 A | * | 9/1931 | Jones | |
| 2,487,343 A | * | 11/1949 | Kopf | |
| 2,951,731 A | * | 9/1960 | Rushing | |
| 3,322,338 A | * | 5/1967 | Stallman et al. | |
| 3,430,852 A | * | 3/1969 | Lenkey et al. | |
| 3,779,451 A | * | 12/1973 | Lehman | |
| 3,902,659 A | * | 9/1975 | Brinkmann et al. | |
| 4,201,066 A | * | 5/1980 | Nolan, Jr. | |
| 4,236,426 A | * | 12/1980 | Meinke et al. | |
| 4,334,718 A | * | 6/1982 | Hirt et al. | 464/180 |
| 4,411,637 A | * | 10/1983 | Rauch | 464/180 |
| 4,846,773 A | * | 7/1989 | Giebeler et al. | 494/82 |
| 4,910,502 A | * | 3/1990 | Serveau et al. | |
| 4,981,585 A | * | 1/1991 | Kelley et al. | |
| 5,026,341 A | * | 6/1991 | Giebeler | 74/574 |
| 5,342,282 A | * | 8/1994 | Letourneur | 494/82 |
| 5,983,750 A | * | 11/1999 | Burgers | 74/574 |

FOREIGN PATENT DOCUMENTS

| | | | |
|---|---|---|---|
| DE | 64234 | * | 11/1927 |
| DE | 3414774 | * | 10/1984 |
| GB | 1192904 | * | 5/1970 |
| WO | 83/03985 | * | 11/1983 |

* cited by examiner

*Primary Examiner*—Charles E. Cooley
(74) *Attorney, Agent, or Firm*—Baker & Hostetler LLP

(57) ABSTRACT

In a centrifuge comprising a rotor shaft assembly, a diaphragm disposed about the rotor shaft assembly reduces noise and vibration. The diaphragm permits the rotor shaft assembly to pivot off a vertical axis while substantially limiting horizontal displacement thereof. Also, where a centrifuge includes a rotor shaft and a drive shaft, a member situated between the rotor shaft and the drive shaft substantially limits vertical displacement of the rotor shaft while allowing angular deflection of the rotor shaft with respect to the drive shaft.

20 Claims, 11 Drawing Sheets

CENTRIFUGE GYRO DIAPHRAGM CAPABLE OF MAINTAINING MOTOR SHAFT CONCENTRICITY

BACKGROUND OF THE INVENTION

1. Field of the Invention

The present invention relates to a centrifuge rotor shaft assembly, and more particularly to a centrifuge assembly where a diaphragm is disposed about the rotor shaft assembly to permit the rotor shaft assembly to pivot while substantially limiting horizontal displacement thereof. Also, a member situated between a rotor shaft and a rotor shaft substantially limits vertical displacement of the rotor shaft, while allowing angular deflection of the rotor shaft with respect to the drive shaft.

2. Description of the Prior Art

A centrifuge instrument is a device by which liquid samples may be subjected to a centrifugal force. The samples are typically carried in tubes situated within a member known as a centrifuge rotor. The rotor is mounted at the top of a rotor shaft, which is connected to a drive shaft that provides a source of motive energy. Centrifuge drive systems must be designed to accommodate unbalanced rotating loads. The imbalance may exist initially when loading samples into the centrifuge rotor, or it may result from a tube failure during operation of the centrifuge. The imbalance represents a non-uniform distribution of matter throughout the mass of the rotor.

Any given mass, or centrifuge rotor, has a geometric center based on the dimensions of the mass, and a mass center based on the distribution of matter within the mass. The mass center is also referred to as the center of gravity. In an actual mass or centrifuge rotor, the mass center is offset from the geometric center due to machining errors and density variations. A rotating mass mounted on a drive and suspension system, has a critical speed at which the mass laterally shifts its axis of rotation from rotating about its geometric center to rotating about its mass center.

Centrifuge drive systems operate below and above a critical speed. Below the critical speed, the centrifuge rotor rotates about its geometric center. Above the critical speed, the centrifuge rotor attempts to rotate about its mass center. Because centrifuge drive and suspension systems need to have some type of spring in the system to allow the transition through critical speed, the centrifuge rotor approaches rotation about its mass center. A vibration is induced because centrifuge rotor mass center and the centerline of the drive system do not fully align. The amount of vibration that the rotor produces at a given speed is dependent on the distance between the rotor's mass center and drive geometric center. If the components of the drive system for the centrifuge are rigidly interconnected, then the vibration would subject the drive system to damaging stresses that could possibly destroy the centrifuge. Accordingly, centrifuge drive systems are typically designed to enjoy a certain degree of flexibility.

For a centrifuge rotor to approximate rotation about its mass center, the rotor shaft must be allowed to horizontally shift its axis of rotation. Accordingly, two flexible joints are required between the drive shaft and the rotor shaft. Flexible shafts and gyros, which are well known in the prior art, both allow the required horizontal shift.

A flexible shaft must bend or deflect in order to allow a rotor to spin about its mass center. The greater the flexibility of the shaft, the further it can be deflected to accommodate the horizontal shift and thus reduce the load on the centrifuge motor bearings, motor suspension and instrument frame. However, there is a tradeoff. Greater flexibility is generally achieved by reducing the diameter of the flexible shaft. Smaller diameter shafts have a greater difficulty in making the critical speed transition, and they can be more easily damaged by an unbalanced rotor or by a rotor that has been dropped on the shaft. Smaller diameter shafts also limit the amount of torque that can be transmitted, thus limiting the acceleration rate.

Gyro systems are more robust and less expensive to replace than flexible shaft systems. A gyro system is basically comprised of a rotor shaft pivotally connected to a drive shaft or motor shaft through an intermediate coupling. The intermediate coupling serves as a universal joint that allows the axis of the rotor shaft to assume a position different from that of the drive shaft. The centrifuge rotor is connected to the rotor shaft with a flexible coupling.

The problem associated with centrifuge operation above critical speed is well recognized in the prior art. The following patents illustrate several mechanisms that have been developed to reduce vibrations.

U.S. Pat. No. 3,770,191 (Blum) discloses a centrifuge drive system that automatically causes the center of gravity of a rotor to become aligned with the axial center of the drive system. An articulated rotor shafts permits lateral movement of the rotor whereby the geometric center of the rotor can be displaced so that its center of gravity becomes aligned with the axis of the drive system. A sliding block element is disposed about the articulated rotor shaft to reduce undue vibration of the shaft.

U.S. Pat. No. 4,568,324 (Williams) discloses a drive shaft assembly including a damper disposed between a flexible shaft and a bearing shaft. The damper accommodates the flexure of the flexible shaft while damping vibrations that are imposed on the flexible shaft by a rotor.

U.S. Pat. No. 5,827,168 (Howell) discloses a disk, rotatably attached to a centrifuge drive shaft, for reducing vertical vibrations of the drive shaft. Damping bearings are positioned against a surface of the disk to reduce vibrations thereof.

FIG. 1 shows a cross section of a typical centrifuge gyro drive shaft assembly of the prior art. A gyro housing 10 generally encloses one end of a rotor shaft 15 and one end of a drive shaft 25, which are interconnected through a coupling 20. The other end of drive shaft 25 is housed within a motor 40. Rotor shaft 15 is supported within gyro housing 10 by bearings 30a and 30b, and flexible mounting 35. The flexible mounting 35 is composed of a bearing housing 36 and two elastomeric rings 37a and 37b. A rotor (not shown) is positioned on top of rotor shaft 15.

At rest, and at speeds below the critical speed, rotor shaft 15 and drive shaft 25 share a common vertical axis 45. During centrifuge operation, motor 40 provides a rotational motive force that rotates drive shaft 25, coupling 20 and rotor shaft 15. Motor 40 accelerates, thus increasing the angular velocity of rotor shaft 15. At the critical speed, the rotational axis of rotor shaft 15 shifts both horizontally and at an angle away from vertical axis 45. This shift is permitted by flexible mounting 35.

Bearings 30a and 30b are horizontally displaced by the horizontal displacement or shift of rotor shaft 15. Flexible mounting 35 compresses and expands to accommodate the displacement of bearings 30a and 30b. As with any spring mass system, the elastic stiffness of flexible mounting 35 results in a resonant frequency that is within the normal operating range of most centrifuge systems.

A drive assembly configured as shown in FIG. 1 suffers from several inherent deficiencies. First, the horizontal shift of rotor shaft 15 and bearings 30a and 30b is itself a source of resonant vibration. A resonance is undesirable in a system where an objective is to minimize vibration. Second, to accommodate the shift and provide an adequate degree of torsional flexibility, flexible mounting 35 is typically composed of an elastomer. As rotational velocity increases, the elastomer becomes less flexible, and less responsive to the horizontal shift. Third, the elastomer is not a very good thermal conductor. Consequenty; heat generated by bearings 30a and 30b is not efficiently dissipated, and they are therefore stressed and susceptible to premature fatigue.

Another undesirable degree of freedom can be found in the vertical movement of rotor shaft 15. Because bearings 30a and 30b are mounted by elastomeric rings 37a and 37b, rotor shaft 15 can move vertically. This vertical movement introduces another mode of vibration at a resonant frequency within the normal operating range of most centrifuge systems.

There is a need for a centrifuge drive assembly that can accommodate the tendency of a rotor to shift its axis of rotation from its geometric center to its mass center while minimizing vibration introduced by horizontal displacement of the drive shaft assembly.

There is also a need for a centrifuge drive assembly that minimizes vibration caused by a vertical displacement of a rotor shaft while allowing angular deflection of the rotor shaft with respect to a drive shaft. SUMMARY OF THE INVENTION The present invention provides a centrifuge assembly that comprises a rotor shaft assembly and a diaphragm disposed about the rotor shaft assembly. The diaphragm permits the rotor shaft assembly to pivot off a vertical axis while horizontal displacement of the drive shaft assembly is substantially limited.

This unique centrifuge assembly typically comprises a rotor, a rotor shaft assembly and a diaphragm flexibly secured about the rotor shaft assembly. The rotor shaft assembly may include a rotor shaft coupled to the drive shaft via an intermediate coupling, and, optionally, a gyro housing enclosing one end of the rotor shaft and one end of the coupling.

In one embodiment, the diaphragm is comprised of a plurality of radially directed bars.

In a second embodiment, the diaphragm is comprised of an inner flange and an outer flange having a common center point. The flanges are connected by radially directed bars.

In a third embodiment, the diaphragm is a disk with a centrally located hole. The disk provides flexible security throughout a 360° arc.

The centrifuge may additionally comprise one or more springs to vertically support the rotor shaft assembly. The springs can be situated beneath the base of the rotor shaft assembly, or formed from an elastomeric ring and disposed about a load bearing perimeter of the rotor shaft assembly, or can be incorporated into a drive coupling.

The present invention allows nutation of the rotor about the rotor shaft assembly and limits horizontal displacement of the axis of rotation of the coupling. Accordingly, the vibration associated with the horizontal displacement is substantially reduced due to the avoidance of any resonant frequencies within the operating range of the centrifuge rotor. That is, the greater the horizontal stiffness, the higher the resonant frequency is pushed above the operating range of the centrifuge.

Additionally, a member situated between a rotor shaft and a drive shaft limits vertical movement of the rotor shaft while allowing angular deflection of the rotor shaft with respect to the drive shaft. The member takes up a gap between the rotor shaft and the drive shaft caused by manufacturing tolerances. In one embodiment, the member is comprised of a cylindrical spacer and two disk-shaped pads. In a second embodiment, the member is comprised of a first sleeve disposed substantially around an end of the rotor shaft, a second sleeve disposed substantially around an end of the drive shaft, and a column disposed between the two sleeves.

DETAILED DESCRIPTION OF THE INVENTION

Figure 1:
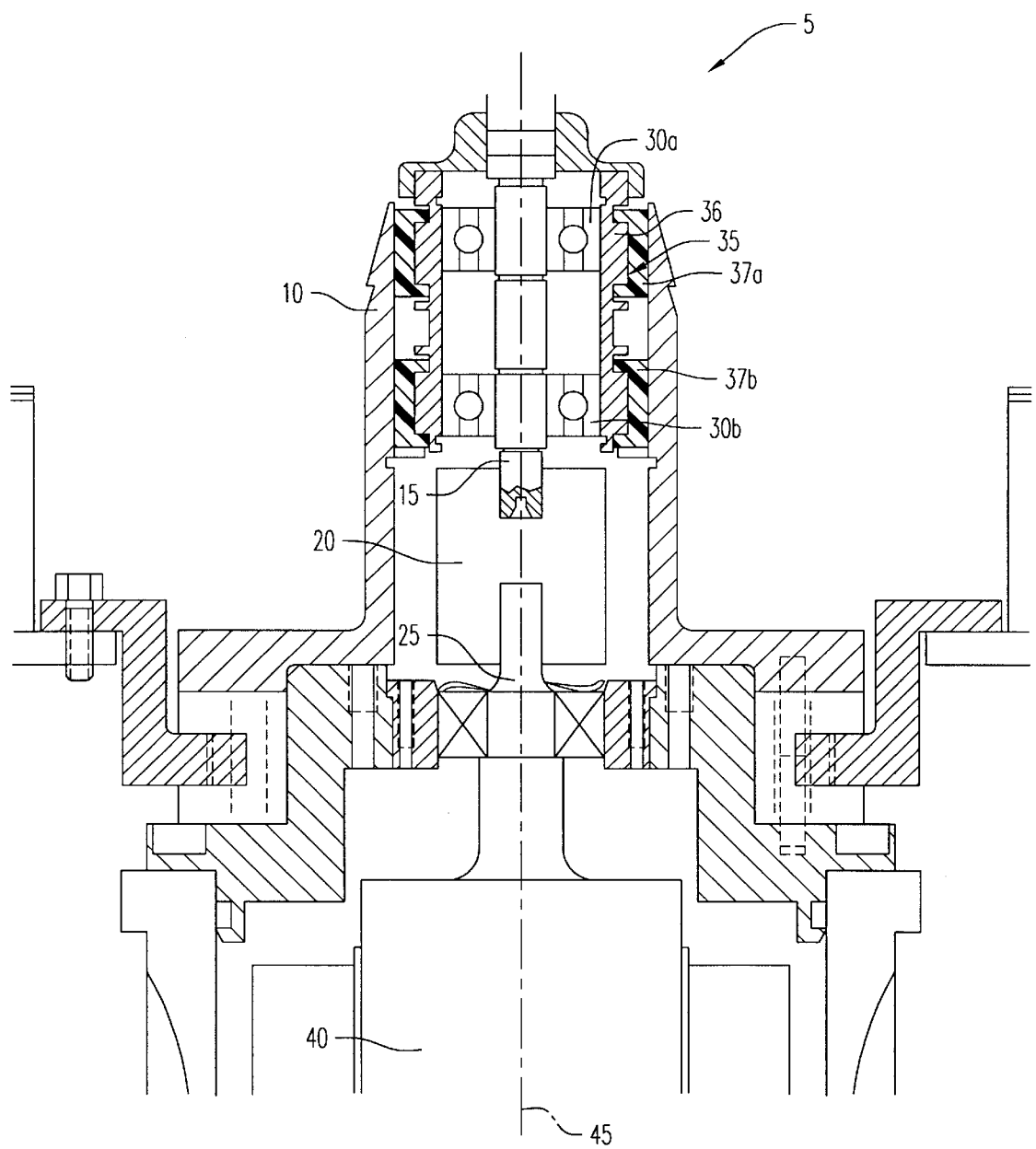
FIG. 1 is a cross section of a centrifuge gyro drive shaft assembly of the prior art.
Figure 2:
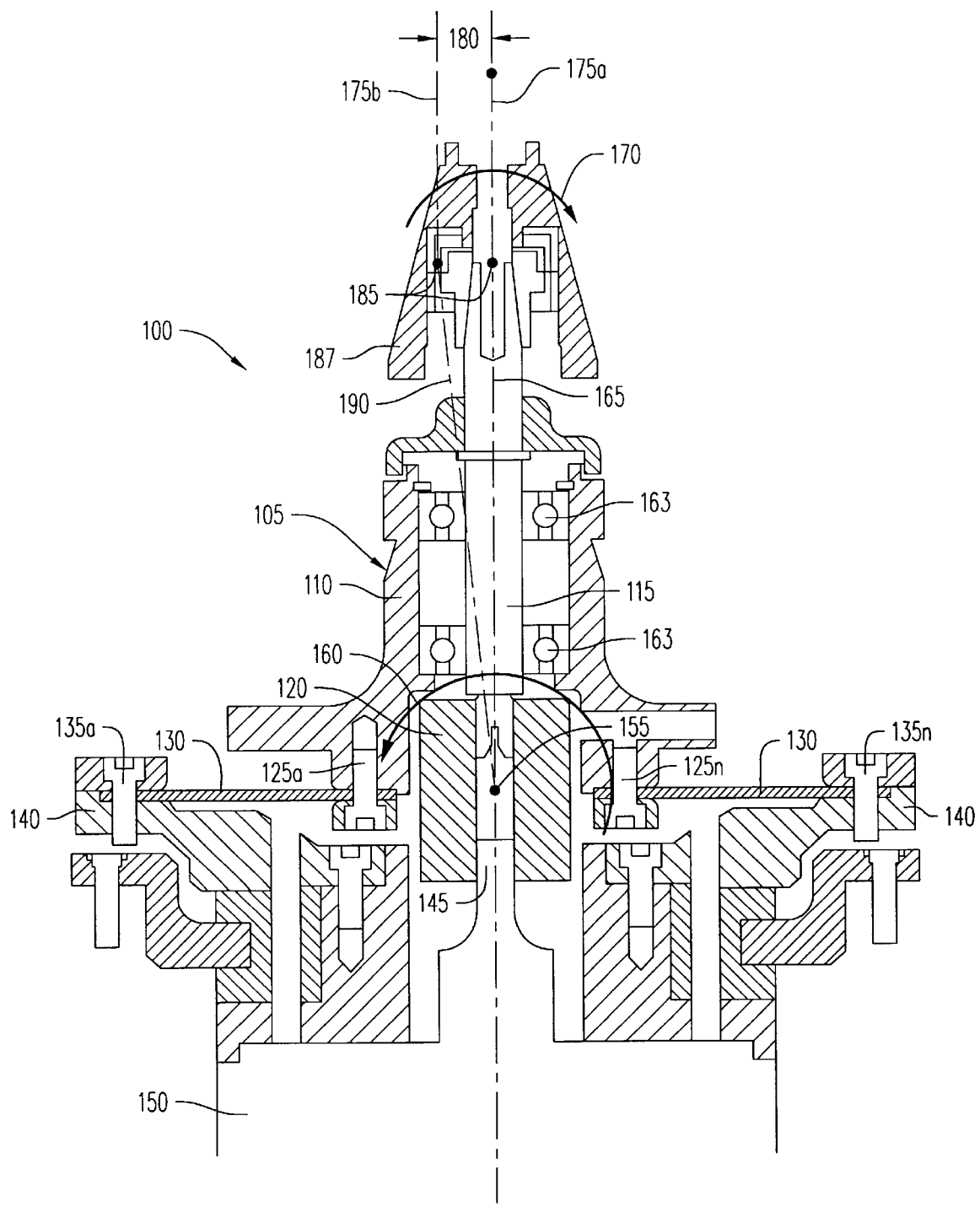
FIG. 2 is a cross section of a centrifuge drive shaft assembly.

FIG. 2 shows a cross section of a centrifuge assembly 100 according to the present invention. Centrifuge assembly 100 has a motor 150, a motor housing 140, a diaphragm 130, a rotor shaft assembly 105, a drive spud 187 and a rotor (not shown).

A drive shaft 145 is coupled to a rotor shaft 115 via a coupling 120. It also includes a gyro housing 110, which encloses one end of rotor shaft 115 and one end of coupling 120. Rotor shaft 115 is supported within gyro housing 110 by bearings 163. Drive spud 187 is pivotally connected to rotor shaft 115, and the rotor is positioned on top of drive spud 187.

Diaphragm 130 is disposed about coupling 120 and flexibly couples rotor shaft assembly 105 to motor housing 140. Diaphragm 130 is, optionally, connected to gyro housing 110 by bolts 125a and 125n, and connected to motor housing 140 by bolts 135 and 135n. As will be described below, diaphragm 13 to pivot on a rotor shaft assembly pivot point 155.

During centrifuge operation, motor 150 provides a rotational motive force that rotates drive shaft 145, coupling 120, rotor shaft 115, drive spud 187, and ultimately the rotor. At speeds below a critical speed the rotor rotates about its geometric center. The rotor's geometric axis is located at an axis 175a, which coincides with a vertical axis 165. Gyro housing 110, rotor shaft 115 and drive shaft 145 are also centered along vertical axis 165. Diaphragm 130 lies in a plane substantially perpendicular to drive shaft 145.

At and above the critical speed, the rotor rotates about its mass center. The mass center is offset from the geometric center by a distance 180. The rotor's mass center aligns with axis 175a, and consequently, the rotor's geometric axis is forced to shift horizontally to axis 175b. The relationship between axis 175a and 175b as shown in FIG. 2 represents an instant in time. As the rotor rotates about its mass center at axis 175a, the rotor's geometric axis revolves around axis 175a. That is, the geometric axis travels in a circle with a centerpoint at axis 175a and a radius of distance 180. Since axis 175a coincides with vertical axis 165, which is also the axis of drive shaft 145, the rotation of the rotor shaft about its mass center is concentric with the rotation of drive shaft 145.

Since the rotor is pivotally connected to drive spud 187 at drive spud pivot point 185, the rotor and its geometric axis are allowed to pivot along an arc 170 and remain vertical. However, the axis of rotor shaft 115 is deflected from vertical axis 165 to an axis 190. Axis 190 is defined by endpoints at drive spud pivot point 185 and rotor shaft assembly pivot point 155. As the rotor rotates about its mass center at axis 175a, axis 190 revolves, and defines a cone of precession, around vertical axis 165. As seen in FIG. 2, the rotor shaft assembly 105 is permitted to pivot with respect to drive shaft 145 and vertical axis 165 when the rotor is rotating.

As the axis of rotor shaft 115 is deflected to axis 190, diaphragm 130 permits gyro housing 110 to pivot along an arc 160 so that the centerline of gyro housing 110 likewise coincides with axis 190. In this illustration, which shows an instant in time, gyro housing 110 pivots on rotor shaft assembly pivot point 155 in a counter-clockwise direction as shown by arc 160. The side of gyro housing 110 that is connected to diaphragm 130 by bolt 125a moves down, and the other side of gyro housing 100, which is connected to diaphragm 130 by bolt 125n, moves up. During centrifuge operation, gyro housing 110 oscillates about vertical axis 165. This oscillatory movement on the part of gyro housing 110 is referred to as "mutation". Gyro housing 110 is thus permitted to pivot off vertical axis 165 but its horizontal displacement is substantially limited.

In an actual centrifuge system, the difference between a rotor's mass center and geometric center, i.e., distance 180, is typically about 0.05 (50 thousandths) inches, and arc 160 represents about 1° of angular displacement off the vertical axis 165. The nutation of a gyro housing 110 is barely discernible to the naked eye, but a tremendous amount of force must be constrained. For example, a 57 pound rotor rotating at 9,000 cycles per minute (CPM) is subjected to approximately 6,000 pounds of centrifugal force.

Gyro housing 110 nutates, and diaphragm 130 flexes, at the same rate that the rotor rotates. Diaphragm 130 must be flexible enough to accommodate the nutation of gyro housing 110, yet strong enough to endure the stress imposed during centrifuge operation. Ideally, diaphragm 130 would have a zero spring rate and freely allow the rotor to shift its axis of rotation from its geometric center to its mass center. However, all objects oscillate at a natural frequency that is a function of their spring rate and mass. In practical application, diaphragm 130 is designed with a spring rate greater than the operating frequency of the centrifuge system. That is, a lower spring rate can be used in a centrifuge system with a heavy rotor and a low operating frequency, than in a system with a light rotor or high operating frequency. Several alternative embodiments of diaphragms are presented below.

Figure 3:
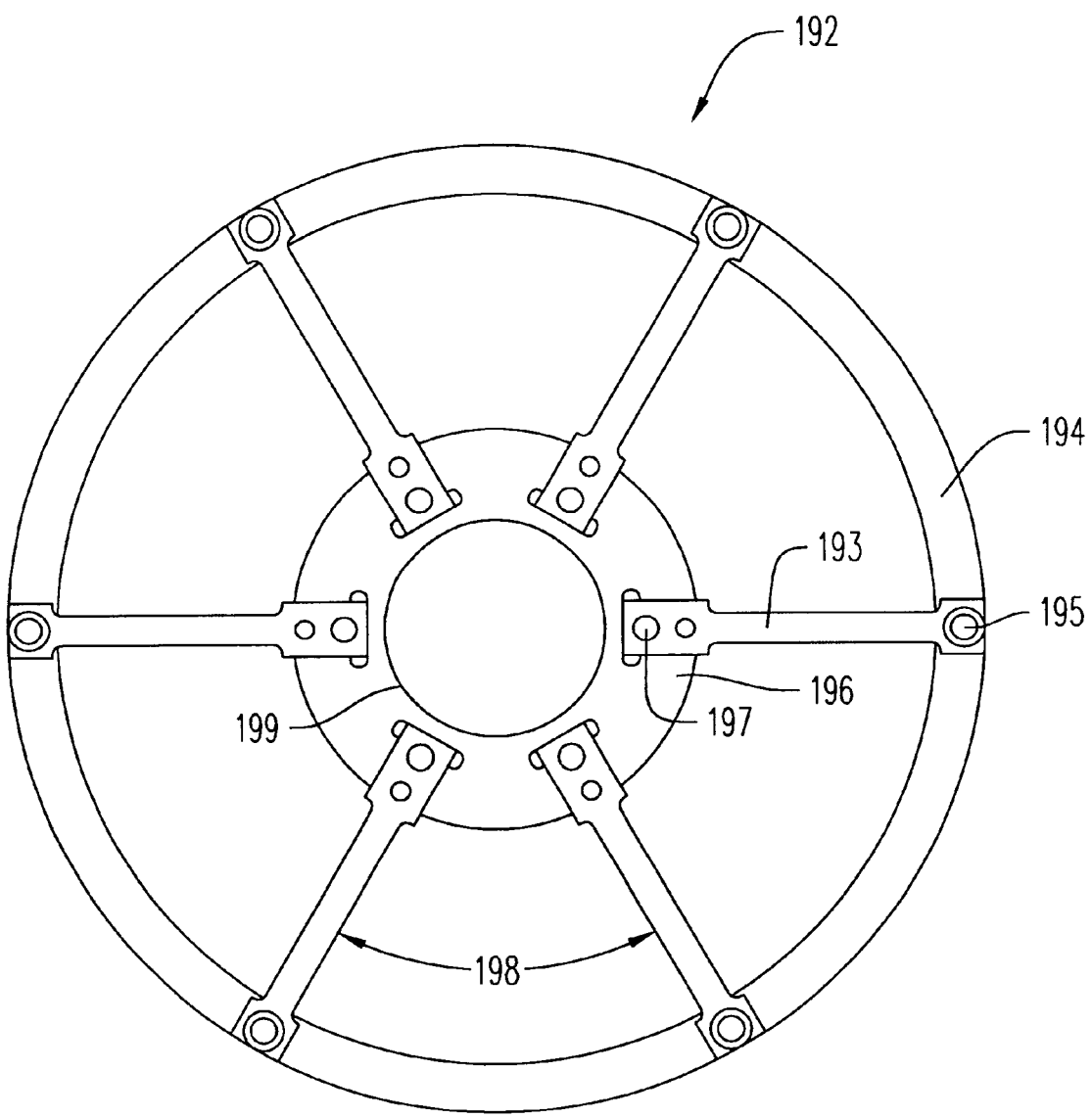
FIG. 3 is a top planar view of a diaphragm according to one embodiment of the present invention.

FIG. 3 is a top planar view of one embodiment of a diaphragm 192 according to the present invention. Diaphragm 192 is comprised of a plurality of radially directed bars 193 disposed about the circumference of a coupling 199 at regular angular intervals 198. Bars 193 are connected to a motor housing 194 by bolts placed through holes 195, and connected to a gyro housing 196 by bolts placed through holes 197. Bars 193 are approximately 0.180 inches wide and 0.060 inches thick, and manufactured of stainless steel.

Figure 4:
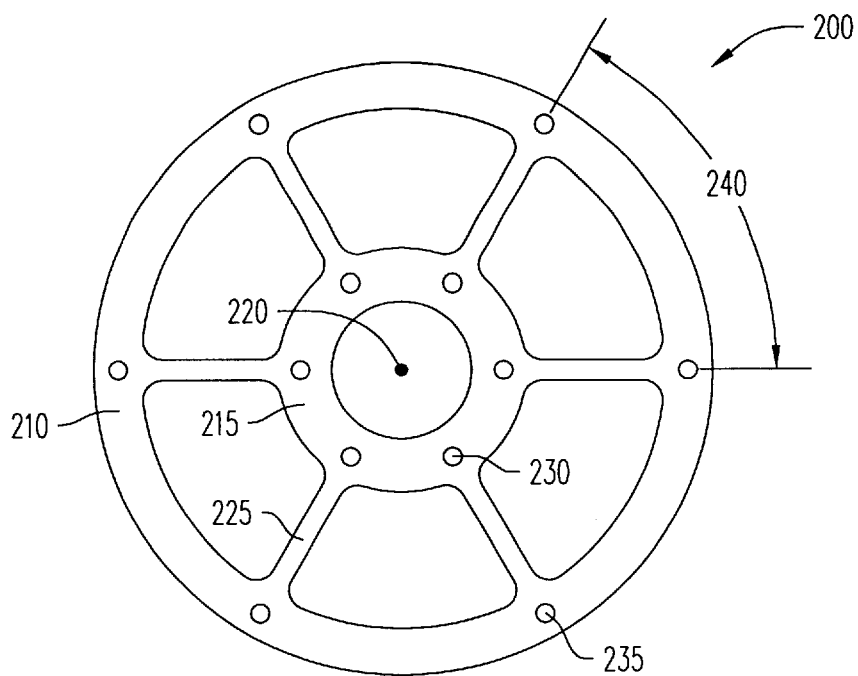
FIG. 4 is a top planar view of another embodiment of a diaphragm according to the present invention.

FIG. 4 shows another embodiment of a diaphragm 200 according to the present invention. An outer flange 210 and inner flange 215 share a common center point 220. Inner flange 215 and outer flange 210 are connected by radially directed bars 225. Bars 225 are spaced at regular angular intervals 240 to partition diaphragm 200 into substantially equal arcs. Diaphragm 200 is connected to a gyro housing by bolts placed through holes 230, and connected to a motor housing by bolts placed through holes 235. Bars 225 are approximately 0.180 inches wide and 0.060 inches thick. Diaphragm 200 is manufactured of stainless steel.

Figure 5:
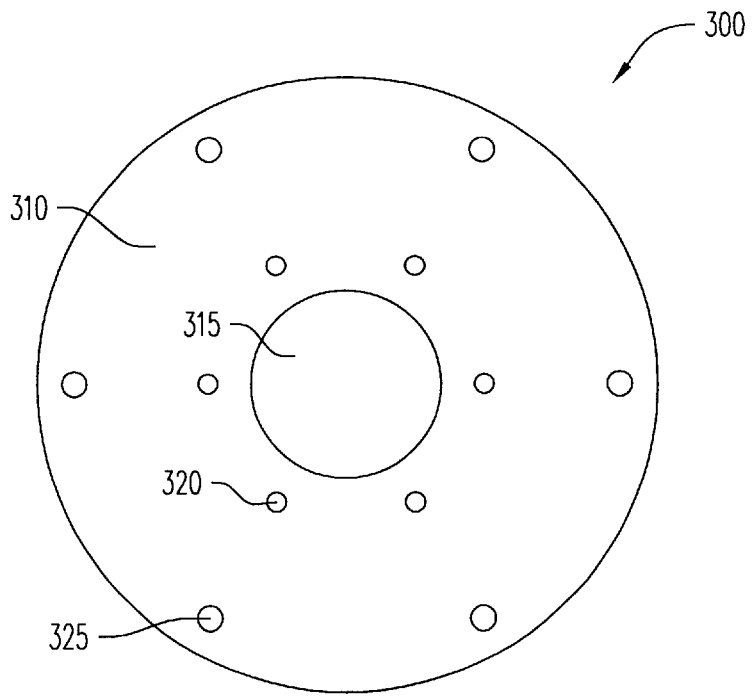
FIG. 5 is a top planar view of still another embodiment of a diaphragm according to the present invention.

FIG. 5 depicts still another embodiment of a diaphragm 300, comprising a disk 310 with a centrally located hole 315. Diaphragm 300 is connected to a gyro housing by bolts placed through holes 320, and connected to a motor housing by bolts placed through holes 325. Diaphragm 300 is manufactured of 16 gauge stainless steel.

Figure 6:
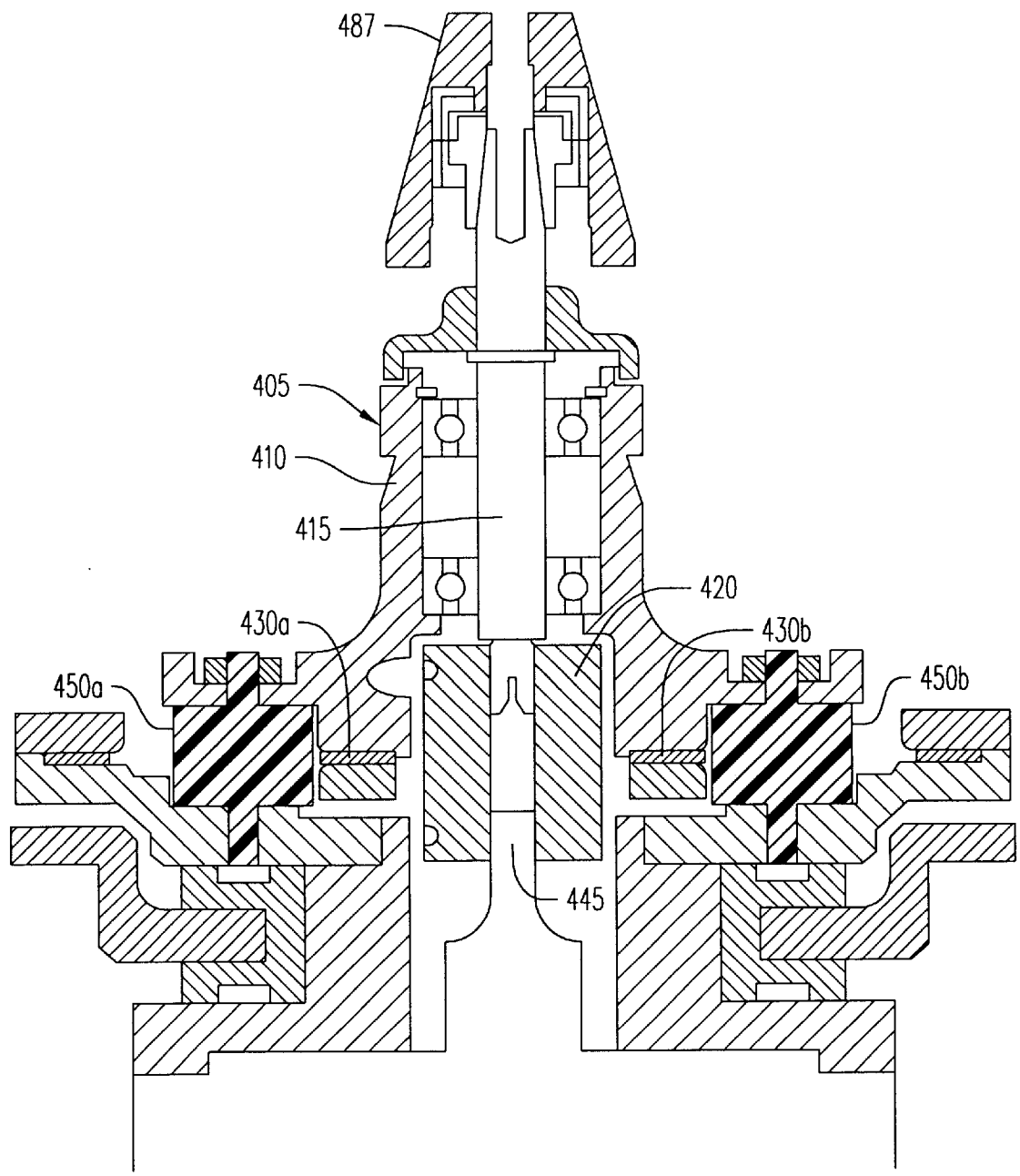
FIG. 6 is a cross-sectional of a centrifuge assembly according to the present invention, including springs for vertical support of a rotor shaft assembly.

FIG. 6 is a cross-sectional view of a centrifuge assembly m which vertical springs provide support for a rotor shaft assembly. A drive shaft 445 is coupled to a rotor shaft 415 via a coupling 420. It also includes a gyro housing 410, which encloses one end of rotor shaft 415 and one end of coupling 420. A flexible drive spud 487 is pivotally connected to rotor shaft 415, and a rotor (not shown) is positioned on top of drive spud 487. A diaphragm with radially directed bars 430a and 430b is disposed about coupling 420. Springs 450a and 450b are positioned to support rotor shaft assembly 405.

Springs 450a and 450b are intended to relieve some of the vertical force imposed upon diaphragm bars 430a and 430b by the combined weight of rotor shaft assembly 405 and the centrifuge rotor. Springs 450a and 450b serve to extend the useful life of diaphragm bars 430a and 430b.

Springs 450a and 450b can be a manufactured of a metallic or elastomeric material. Practical examples include helical springs, wound springs, machined springs and elastomeric springs such as a Lord FlexBolt™, manufactured by Lord Corporation of Erie, Pa. However, elastomeric springs, as compared to metallic springs, provide better damping of vertical and oscillatory ringing of rotor shaft assembly 405

Figure 7:
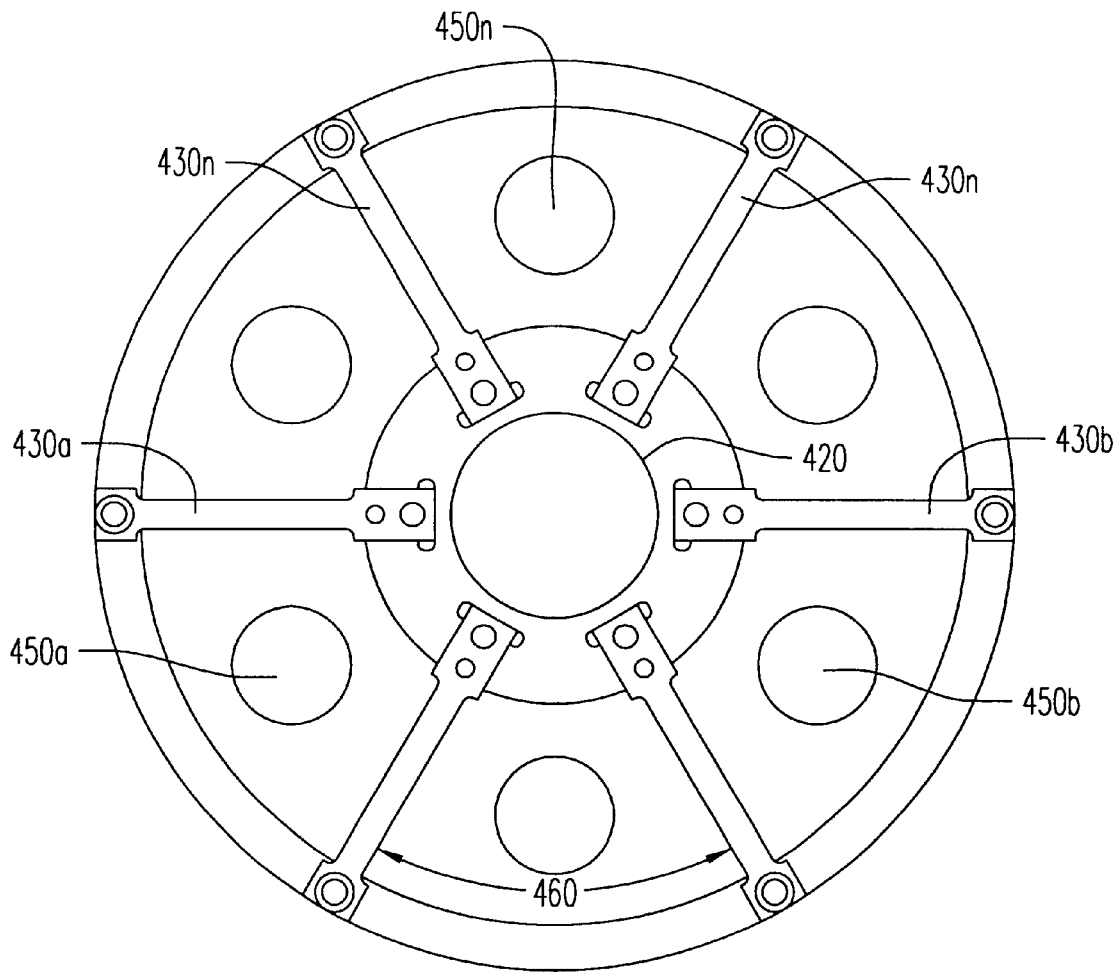
FIG. 7 is a top planar view depicting the relationship between the springs and diaphragm bars.

FIG. 7 is a top planar view showing the relationship of springs to diaphragm bars. Springs 450a and 450b, and bars 430a and 430b, are subsets of a plurality of springs 450a–450n, and bars 430a–430n, respectively. Springs 450a–450n and bars 430a–430n are disposed about the perimeter of coupling 420. Any given spring 450a–450n is located in an arc 460 formed between two adjacent bars 430a–430n.

Figure 8:
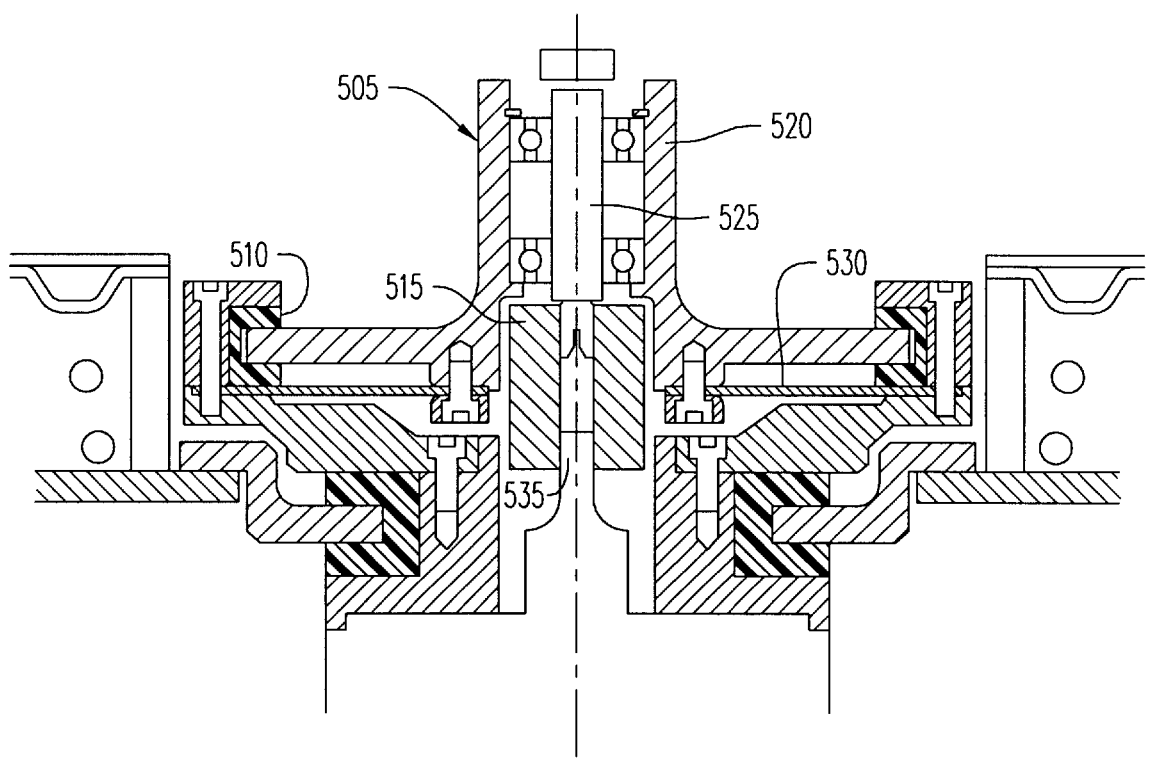
FIG. 8 is a cross-sectional view of a centrifuge drive shaft assembly with another embodiment of a spring.

FIG. 8 is a cross-sectional view of a centrifuge assembly with another embodiment of a spring for vertical support of a rotor shaft assembly. A rotor shaft assembly 505 includes a gyro housing 520 generally enclosing one end of a rotor shaft 525 and one end of a drive shaft 535, which are interconnected through a coupling 515. A flexible drive spud (not shown) and a rotor shaft (not shown) are positioned on top of rotor shaft 525. A diaphragm 530 is disposed about coupling 515. Spring 510 is disposed about a load-bearing perimeter of gyro housing 520.

Spring 510 is a solid elastomer ring. It absorbs some of the vertical force imposed upon diaphragm 530 by the combined weight of rotor shaft assembly 505 and the centrifuge rotor. Spring 510 serves to extend the useful life of diaphragm 530.

Figure 9A:
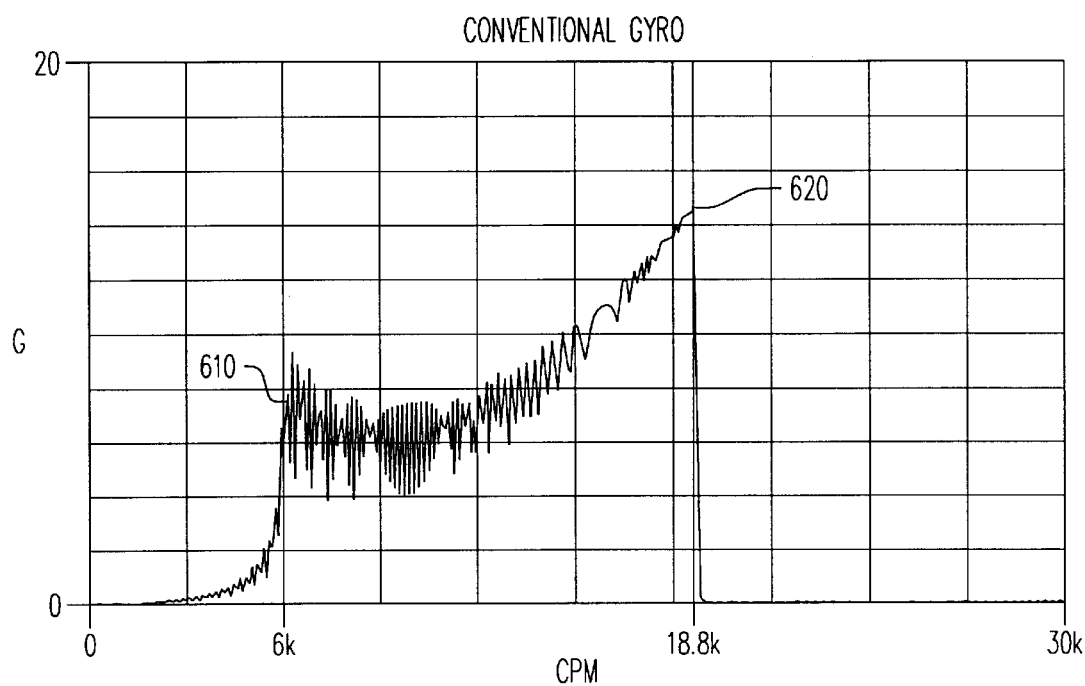
FIG. 9A is a graph depicting the vibratory force produced by a conventional gyro of the prior art.
Figure 9B:
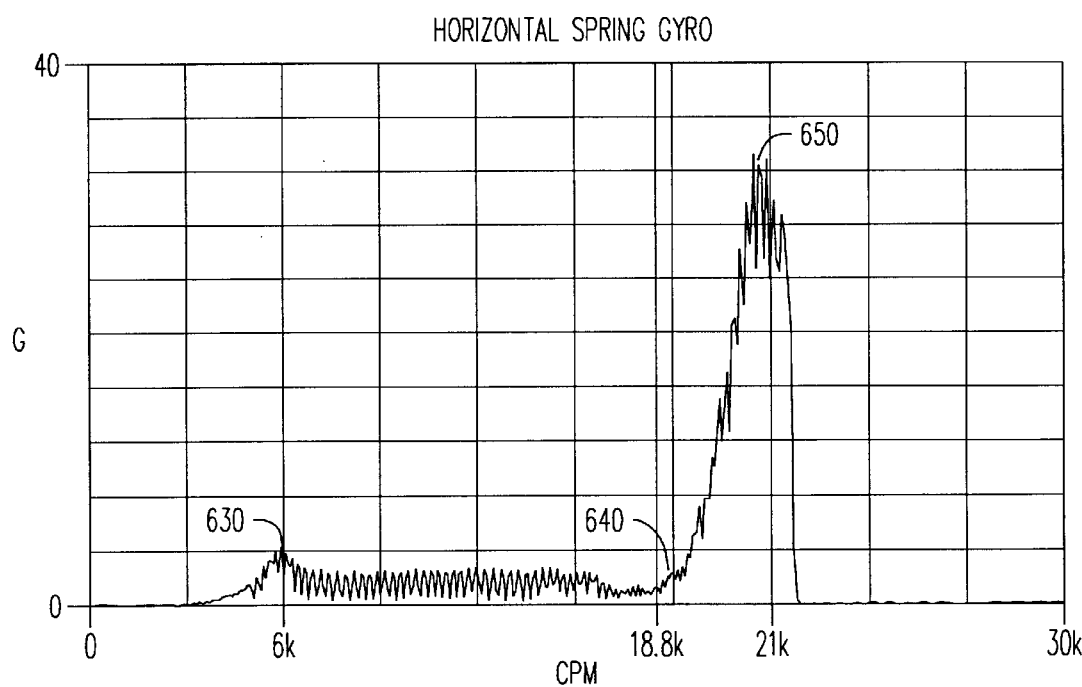
FIG. 9B is a graph depicting the vibratory force produced by a horizontal spring gyro of the present invention.

FIGS. 9A and 9B are graphs comparing the performance of a conventional gyro (FIG. 9A) to a horizontal spring gyro of the present invention (FIG. 9B). The horizontal axes of these graphs represent rotor cycles per minute (CPM) and the vertical axes represent units of acceleration (G).

A conventional gyro, represented in FIG. 9A, produces significant vibrations of approximately 7G at 6k CPM (ref. 610), and increases to approximately 14.3G at 18.8k CPM (ref. 620).

In contrast, a horizontal spring gyro of the present invention, represented in FIG. 9B, produces vibrations of approximately 4G at 6k CPM (ref. 630) and 2G at 18.8k CPM (ref. 640). The vibrations of the horizontal spring gyro are significantly lower than those of the conventional gyro in the range of 6k CPM to 18.8k CPM. Vibratory acceleration peaked at approximately 32.3G at 20.5k CPM (ref. 650). 20.5k CPM is therefore the resonant frequency of the system. The frequency at which the peak occurs is adjustable by altering the thickness and width of the bars in the various embodiments of the diaphragm of the present invention. As the bars are made thicker and wider, the spring rate and the resonant frequency of the system increases. The spring rate can be increased to set the resonant frequency above the operating frequency range of the system.

Figure 10:
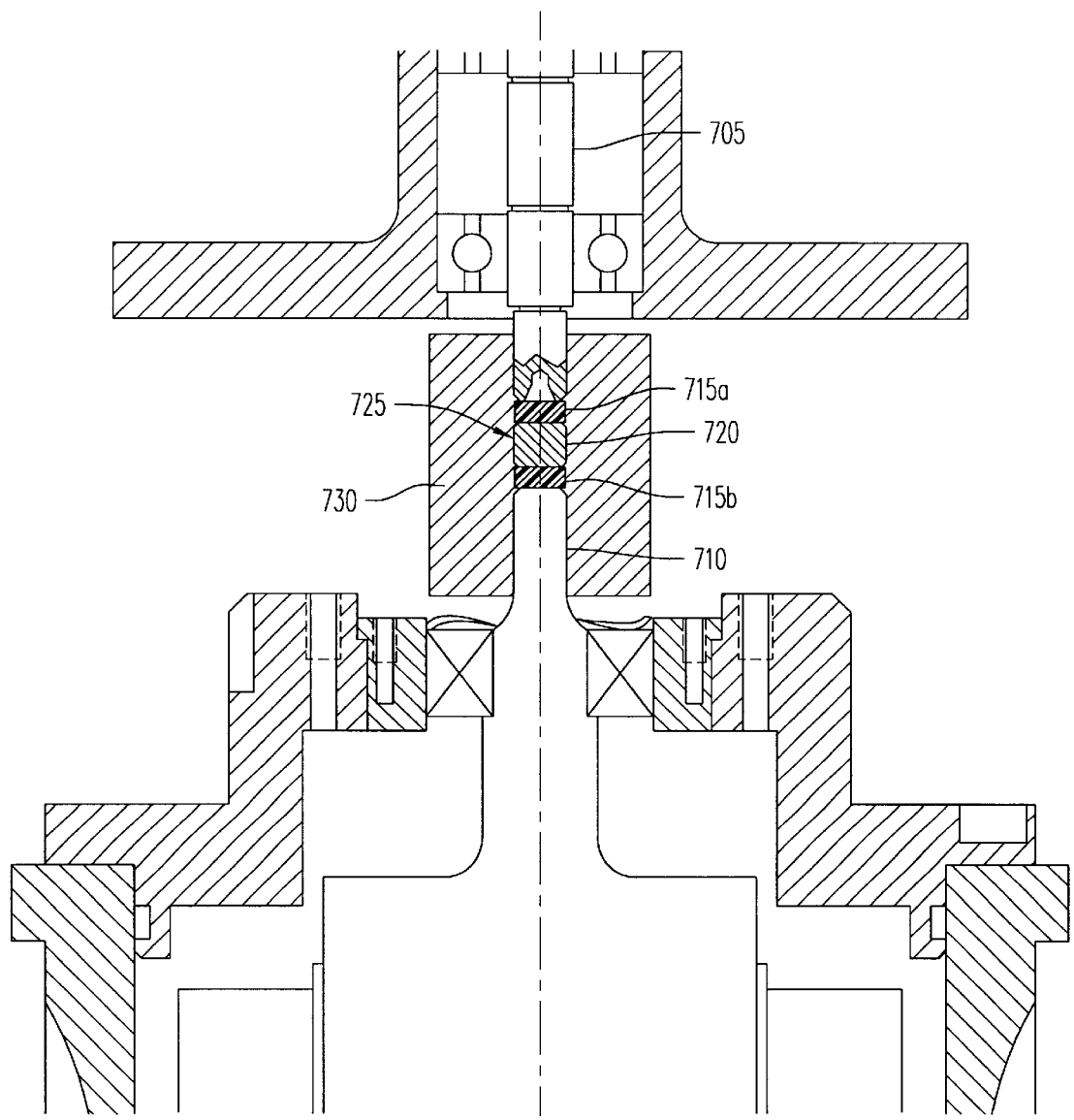
FIG. 10 is a cross-sectional view of one embodiment of a member situated between a rotor shaft and a drive shaft according to the present invention.

FIG. 10 shows one embodiment of a member situated between a rotor shaft and a drive shaft for limiting vertical displacement of the rotor shaft. A member 725 is situated between a rotor shaft 705 and a drive shaft 710. Member 725 is accommodated within an axially directed center hole through a coupling 730, and is held in place by coupling 730.

Member 725 is comprised of a metal cylindrical spacer 720 and two rubber disk-shaped pads 715a and 715b. However, a spacer 720 or pad 715a alone may be adequate in some applications. Spacer 720 and pads 715a and 715b can be made of metal, rubber, nylon, polymeric material or any stiff elastomeric material.

Downward movement of rotor shaft 705 is limited by member 725. Pads 715a and 715b will compress to allow an angular deflection of rotor shaft 705 in relation to drive shaft 710.

Figure 11A:
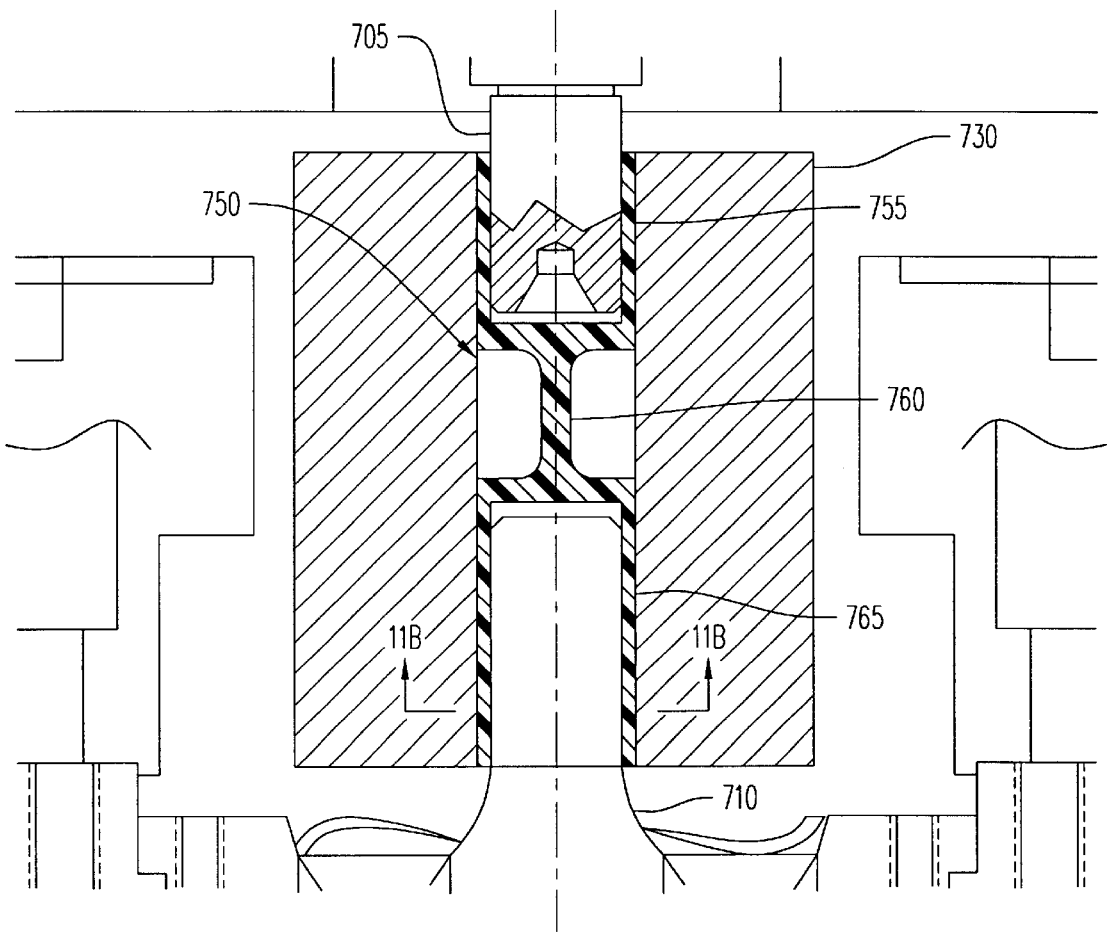
FIG. 11A is a cross-sectional view of a second embodiment of a member situated between a rotor shaft and a drive shaft according to the present invention.

FIG. 11A shows a second embodiment of a member situated between a rotor shaft and a drive shaft for limiting vertical displacement of the rotor shaft. A member 750 is situated between a rotor shaft 705 and a drive shaft 710. Member 750 is accommodated within an axially directed center hole through a coupling 730, and is held in place by coupling 730.

Member 750 is comprised of a column 760 disposed between a first sleeve 755 and second sleeve 765. Sleeve 755 slides over and substantially around an end of rotor shaft 705. Sleeve 765 slides over and substantially around an end of drive shaft 710. Member 750 can be made of metal, rubber, nylon, polymeric or any stiff elastomeric material.

The diameter of column 760 is small enough, and flexible enough, to allow an angular deflection of rotor shaft 705 in relation to drive shaft 710. Vertical movement of rotor shaft 705 will be limited by the firmness of column 760.

Figure 11B:
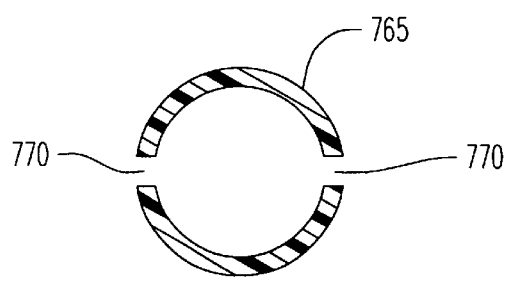
FIG. 11B is a top planar view of a sleeve with a slit as seen along line 11B—11B of FIG. 11A.

Referring to FIG. 11B, sleeve 765 includes axial slits 770. Sleeve 755, in FIG. 11A, also includes slits. The slits 770 allow sleeves 755 and 765 to more easily slide over the ends of their respective shafts 705 and 710.

Figure 12A:
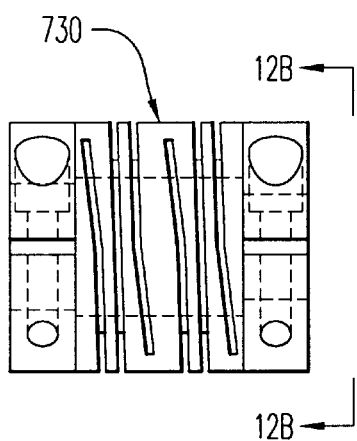
FIG. 12A is a side elevation of a flexible coupling.
Figure 12B:
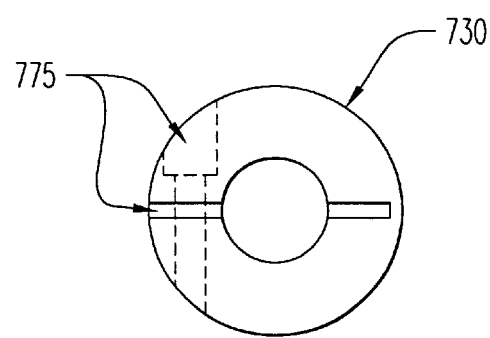
FIG. 12B is an end view of a flexible coupling as seen along line 12B—12B of FIG. 12A.

As shown in FIGS. 12A and 12B, coupling 730 includes a clamping mechanism 775 to compress slits 770 and secure sleeves 755 and 765 to shafts 705 and 710, respectively. A single piece flexible shaft coupling such as that shown in FIGS. 12A and 12B is available from Helical Products Co. of Santa Maria, Calif. Generally, coupling 730 can be any type of shaft coupling with a center hole.

Alternatively, instead of including and compressing slits 770, sleeves 755 and 765 can be secured to shafts 705 and 710 using set screws (not shown).

Those skilled in the art, having the benefit of the teachings of the present invention may impart numerous modifications thereto. Such modifications are to be construed as lying within the scope of the present invention, as defined by the appended claims.

What is claimed is:

1. A centrifuge assembly comprising:

a rotor;

a rotor shaft assembly coupled to said rotor;

a motor coupled to said rotor shaft assembly via a drive shaft, for rotating said rotor via said rotor shaft assembly, said drive shaft defining a vertical axis of rotation; and said rotor shaft assembly being pivotable with respect to said vertical axis and said drive shaft;

a flexible diaphragm means, disposed about said rotor shaft assembly, for substantially aligning an axis of said rotor shaft assembly with a geometric axis of said rotor when said rotor is at rest, and for permitting said rotor shaft assembly to pivot with respect to said drive shaft and said vertical axis when said rotor is rotating.

2. The centrifuge assembly of claim 1, wherein said rotor shaft assembly comprises a rotor shaft disposed between said drive shaft and said rotor, and means for coupling said drive shaft to said rotor shaft.

3. The centrifuge assembly of claim 2, wherein said diaphragm means is disposed about said coupling means.

4. The centrifuge assembly of claim 2, wherein said rotor shaft assembly Writher comprises a gyro housing enclosing one end of said rotor shaft and one end of said coupling means.

5. The centrifuge assembly of claim 1, wherein said diaphragm means is situated in a plane substantially perpendicular lo said vertical axis of rotation.

6. The centrifuge assembly of claim 1, wherein said rotor has a center of mass, and said diaphragm means permits rotation of said rotor about said center of mass.

7. The centrifuge assembly of claim 1, farther comprising a motor housing disposed about said motor, wherein said diaphragm means flexibly couples said rotor shaft assembly to said motor housing.

8. The centrifuge assembly of claim 1, further comprising a pivotal coupling for coupling said motor drive shaft to said rotor shaft assembly, wherein said diaphragm means is disposed about said pivotal coupling.

9. The centrifuge assembly of claim 1, wherein said diaphragm means comprises a disk having a centrally located circular hole disposed about said rotor shaft assembly.

10. The centrifuge assembly of claim 1, further comprising a spring to vertically support said rotor shaft assembly.

11. The centrifuge assembly of claim 10, wherein said spring is selected from the group consisting of helical spring, wound spring, machined spring and elastomeric spring.

12. The centrifuge assembly of claim 10, wherein said spring comprises an elastomer ring disposed about a load-bearing perimeter of said drive shaft assembly.

13. A centrifuge assembly comprising:

a rotor;

a rotor shaft assembly coupled to said rotor;

a motor coupled to said rotor shaft assembly via a drive shaft, for rotating said rotor via said rotor shaft assembly, said drive shaft defining a vertical axis of rotation; and said rotor shaft assembly being pivotable with respect to said vertical axis and said drive shaft;

diaphragm means, including a plurality of flexible radially directed bars, disposed about said rotor shaft assembly, for permitting said rotor shaft assembly to pivot with respect to said drive shaft and said vertical axis while substantially limiting horizontal displacement of said rotor shaft assembly.

14. The centrifuge assembly of claim 13, wherein said plurality of radially directed bars are spaced at angular intervals to partition said diaphragm means into substantially equal arcs.

15. The centrifuge assembly of claim 13, wherein said diaphragm means comprises an inner flange and an outer flange having a common center point, said plurality of radially directed bars connect said inner flange to said outer flange, and said inner flange is disposed about said rotor shaft assembly and between said outer flange and said rotor shaft assembly.

16. The centrifuge assembly of claim 13, further comprising a pivotal coupling for coupling said motor drive shaft to said rotor shaft assembly, wherein said diaphragm means is disposed about said pivotal coupling.

17. A centrifuge assembly comprising:

a rotor;

a rotor shaft assembly coupled to said rotor;

a motor coupled to said rotor shaft assembly via a drive shaft, for rotating said rotor via said rotor shaft assembly; said drive shaft assembly defining a vertical axis of rotation; and said rotor shaft assembly being pivotable with respect to said vertical axis and said drive shaft;

flexible means for supporting said rotor shaft assembly above said motor and for permitting said rotor shaft assembly to pivot with respect to said drive shaft and said vertical axis when said rotor is rotating.

18. The centrifuge assembly of claim 17, Her comprising a pivotal coupling for coupling said motor drive shaft to said rotor shaft assembly, wherein said supporting means is disposed about said pivotal coupling.

19. A centrifuge assembly comprising:

a rotor;

a rotor shaft assembly coupled to said rotor;

a motor coupled to said rotor shaft assembly via a drive shaft, for rotating said rotor via said rotor shaft assembly; said drive shaft defining a vertical axis of rotation; and said rotor shaft assembly being pivotable with respect to said vertical axis and said drive shaft;

a flexible diaphragm means, for supporting said rotor shaft assembly above said motor, for substantially aligning an axis of said rotor shaft assembly with a geometric axis of said rotor when said rotor is at rest, and for permitting said rotor shaft assembly to pivot with respect to said drive shaft and said vertical axis when said rotor is rotating.

20. The centrifuge assembly of claim 19, further comprising a pivotal coupling for coupling said motor drive shaft to said rotor shaft assembly, wherein said diaphragm means is disposed about said pivotal coupling.

* * * * *